United States Patent
Anhut et al.

(10) Patent No.: US 12,055,700 B2
(45) Date of Patent: Aug. 6, 2024

(54) LIGHT MICROSCOPE WITH PHOTON-COUNTING DETECTOR ELEMENTS AND IMAGING METHOD

(71) Applicants: Carl Zeiss Microscopy GmbH, Jena (DE); Ecole Polytechnique Federale de Lausanne, Lausanne (CH)

(72) Inventors: Tiemo Anhut, Jena (DE); Daniel Schwedt, Jena (DE); Ivan Michel Antolovic, Lausanne (CH); Claudio Bruschini, Villars-sous-Yens (CH); Edoardo Charbon, Jouxtens-Mezery (CH)

(73) Assignee: Carl Zeiss Microscopy GmbH, Jena (DE)

( * ) Notice: Subject to any disclaimer, the term of this patent is extended or adjusted under 35 U.S.C. 154(b) by 510 days.

(21) Appl. No.: 17/424,293

(22) PCT Filed: Jan. 25, 2019

(86) PCT No.: PCT/EP2019/051927
§ 371 (c)(1),
(2) Date: Jul. 20, 2021

(87) PCT Pub. No.: WO2020/151838
PCT Pub. Date: Jul. 30, 2020

(65) Prior Publication Data
US 2022/0075171 A1   Mar. 10, 2022

(51) Int. Cl.
*G02B 21/00* (2006.01)
*G01N 21/64* (2006.01)

(52) U.S. Cl.
CPC ..... *G02B 21/0076* (2013.01); *G01N 21/6458* (2013.01); *G02B 21/0032* (2013.01)

(58) Field of Classification Search
CPC ............ G02B 21/0076; G02B 21/0032; G02B 21/00; G02B 21/0004; G02B 21/002;
(Continued)

(56) References Cited

U.S. PATENT DOCUMENTS 9,997,551 B2    6/2018   Mandal et al.
10,101,203 B2  10/2018  Birk et al.
(Continued)

FOREIGN PATENT DOCUMENTS

DE   102016119730 A1   4/2018
EP       3182154 A1    6/2017
(Continued)

OTHER PUBLICATIONS

Sheppard, C.J.R., et al.; "Super-resolution in Confocal Imaging"; Optik 1988; 80(2):53-54.
(Continued)

*Primary Examiner* — Arnel C Lavarias
(74) *Attorney, Agent, or Firm* — Duane Morris LLP

(57) ABSTRACT

A light microscope has a light source for illuminating a specimen, a photon-counting detector array with a plurality of photon-counting detector elements for measuring detection light coming from the specimen, wherein the photon-counting detector elements are configured to output respective measured photon count rates, and a control device for controlling the photon-counting detector array. The control device is configured to individually influence the measurable photon count rates which are simultaneously measurable with different photon-counting detector elements and/or which are consecutively measurable with the same photon-counting detector element. Furthermore, in an imaging method the measurable photon count rates of photon-count-
(Continued)

ing detector elements are individually influenced to increase the signal-to-noise ratio for the photon-counting detector array.

20 Claims, 3 Drawing Sheets

(58) Field of Classification Search
CPC .......... G02B 21/0024; G02B 21/0036; G02B 21/0048; G02B 21/0052; G02B 21/0072; G02B 21/008; G02B 21/06; G02B 21/36; G02B 21/361; G02B 21/365; G02B 21/367; G01N 21/6458; G01N 21/6456; G01N 2021/6463; G01N 21/6486
USPC ....... 359/368, 362, 363, 369, 385, 388, 389, 359/390
See application file for complete search history.

(56) References Cited

U.S. PATENT DOCUMENTS

| | | |
|---|---|---|
| 2008/0008479 A1 | 1/2008 | Moehler et al. |
| 2016/0064579 A1 | 3/2016 | Hirigoyen |
| 2018/0039053 A1 | 2/2018 | Kremer et al. |
| 2018/0209846 A1 | 7/2018 | Mandai et al. |
| 2018/0284413 A1* | 10/2018 | Kubo ................. G01N 21/6458 |
| 2019/0258041 A1* | 8/2019 | Anhut ................ G02B 21/0024 |
| 2021/0404964 A1* | 12/2021 | Schwedt ............. G02B 21/004 |

FOREIGN PATENT DOCUMENTS

| | | |
|---|---|---|
| JP | 2008015492 A | 1/2008 |
| JP | 2010250102 A | 11/2010 |
| JP | 2016143030 A | 8/2016 |
| JP | 2018512573 A | 8/2016 |
| JP | 20192019532360 A | 11/2019 |

OTHER PUBLICATIONS

Sheppard, C.J.R., et al.; "Superresolution by image scanning microscopy using pixel reassignment"; Optics Letters 2013; 38(15):2889-2892.
Antolovic, Ivan Michel, et al.; "Dynamic range extension for photon counting arrays"; Optics Express 2018; 26 (17):22234-22248.
International Search Report dated Oct. 25, 2019 for PCT/EP2019/051927.
Nov. 9, 2022 Notice of Reasons for Refusal issued by the Japanese Patent Office for Japanese Patent Application No. 2021-540157 (14 pages). [English translation included].
Apr. 24, 2023 Notice of Reasons for Refusal issued by the Japanese Patent Office for Japanese Patent Application No. 2021-540157 (15 pages). [English translation included].
Jul. 28, 2023 Decision to Grant a Patent issued by the Japanese Patent Office for Japanese Patent Application No. 2021-540157 (5 pages). [English translation included].
Dec. 15, 2023 Communication pursuant to Article 94(3) EPC issued by the European Patent Office for European Patent Application No. 19 704 228.6 (9 pages).

* cited by examiner

LIGHT MICROSCOPE WITH PHOTON-COUNTING DETECTOR ELEMENTS AND IMAGING METHOD

RELATED APPLICATIONS

The present application is a U.S. National Stage application of International PCT Application No. PCT/EP2019/051927 filed on Jan. 25, 2019, the contents of which are incorporated by reference in their entirety.

FIELD OF THE DISCLOSURE

The present disclosure relates to a light microscope and to an imaging method in accordance with the features and characteristics of the invention set forth in the annexed claims.

BACKGROUND OF THE DISCLOSURE

Light microscopes are used in a wide variety of applications such as life sciences or material testing. In particular, confocal scanning microscopy is a well-established technique. Current sensor technologies employed in confocal scanning microscopes comprise photomultiplier tubes with multialkali or GaAsP photocathodes, or hybrid detectors comprising a GaAsP photocathode and an APD (avalanche photodiode) detector.

It is a general desire to provide detectors with a high sensitivity and low dark noise as well as a high dynamic range. To allow for short pixel dwell times, a fast response and high count rates from the detector are desirable.

Recent advances see the use of single photon avalanche diodes (SPAD) which offer a high sensitivity, fast response times and low dark counts. They can also be arranged in arrays that allow spatial sampling of the point spread function (PSF) which may be used in image scanning techniques (Airyscan) based on work by Sheppard et al., cf. Sheppard, C. J. *Optik* 80, 53-54 (1988); and Sheppard, C. J., Mehta, S. B. & Heintzmann, R. *Opt. Lett.* 38, 2889-2892 (2013). In certain applications, the PSF is rotationally symmetric but generally any light distribution may be used.

A generic light microscope comprises a light source for illuminating a specimen, a photon-counting detector array with a plurality of photon-counting detector elements for measuring detection light coming from the specimen, wherein the photon-counting detector elements are configured to output respective measured photon count rates, and a control device for controlling the photon-counting detector array. A generic imaging method comprises the steps of illuminating a specimen with illumination light, and measuring detection light coming from the specimen with a photon-counting detector array comprising a plurality of photon-counting detector elements, the photon-counting detector elements outputting respective measured photon count rates.

While SPADs offer a high sensitivity, fast response times and low dark counts, the dynamic range of SPADs is rather limited, in particular due to the dead time of a SPAD. The dead time defines a time span that is needed after detection of a photon by a SPAD until the SPAD is able to detect another photon.

A SPAD comprises a junction with a depletion region lacking any free electric charge carriers. A voltage $V_{OP}$ above the breakdown voltage is applied at the junction. A photon absorbed by the SPAD may be able to inject a carrier in the depletion region and as a consequence, impact ionization may cause an avalanche of carriers that will spread to further regions of the diode and can be detected as a photon count.

To detect a following photon, the avalanche is quenched, e.g., with a quenching resistor. When the diode is quenched (i.e., there is no further current due to impact ionization and no free carriers in the diode), the voltage at the diode will be recharged by a flow of electric current through e.g. the quenching resistor, and the diode is ready to detect another carrier. The time needed from the start of impact ionization until the voltage is restored after the avalanche may be defined as the dead time. Active and passive methods for avalanche quenching exist. In active quenching, the avalanche is detected and stopped by acting on the bias voltage. In passive methods, the junction bias is self-adjusted, e.g., by a ballast resistor. The recharge method itself may also be active or passive.

Photons impinging on the SPAD during its dead time are not registered and hence the dead time limits the dynamic range of the SPAD. A detector array with a plurality of SPAD-based detector elements may be used to increase the dynamic range, however, it is nevertheless desired to further improve the dynamic range.

Typically, a SPAD detector or detector array is operated in an intensity range in which its output (measured photon count rate) is linear to the light intensity impinging on the sensor (also referred to as detection photon count/detected count rate). FIG. 3 shows a graph of the photon count value m measured by a SPAD or SPAD array over the light intensity I. For low intensities, the photon count value m measured by the SPAD array is linear to the light intensity I. At larger intensities, the SPAD array saturates and more and more photons cannot be detected. As a consequence, the measured photon count rate flattens. Note that the showed curve is based on active recharging of the SPAD. In passive recharging, any photons impinging during the dead time may counteract the build-up of the required excess bias voltage and may thus lengthen the dead time. Hence, passive recharging of a SPAD indeed leads to a measured photon count rate that decreases for large intensities that saturate the SPAD.

A recent article titled "Dynamic range extension for photon counting arrays" by Ivan Michel Antolovic et al., published in Vol. 26, No. 17, OPTICS EXPRESS 22234 of 20 Aug. 2018, describes techniques to extend the dynamic range of a SPAD beyond its saturation point. In particular, the flattening part of the measured photon count curve m shown in FIG. 3 may be corrected to output a corrected photon count m-corr also shown in FIG. 3. Such procedures are helpful to deal with large light intensities surpassing a saturation intensity I-sat of the SPAD array. However, it is also important to consider how the signal-to-noise ratio (SNR) depends on the light intensity. As easily understood, the SNR at first increases with the light intensity: in particular, the SNR may be proportional to the square root of the number of photons impinging on the SPAD. However, if the measured photon count curve in its flattened part is corrected (shown with arrows in FIG. 3), the SNR for the corrected photon count rate decreases compared to a Poisson limited signal stream.

There is hence still a need for detection techniques that provide a particularly good SNR over a large dynamic range.

It is an object of the invention to provide a light microscope and an imaging method which provide a particularly high detection sensitivity as well as a large dynamic range with a particularly good signal-to-noise ratio.

SUMMARY OF THE DISCLOSURE

The above-defined object is obtained with a light microscope having the features set forth in the annexed claims.

Preferred embodiments are given in the dependent claims as well as in the following description, in particular in connection with the attached figures.

According to the invention, the light microscope of the above-mentioned kind is characterized in that the control device is configured to individually influence the measurable photon count rates which are simultaneously measurable with different photon-counting detector elements and/or which are consecutively measurable with the same photon-counting detector element.

The above-mentioned method is, according to the invention, characterized at least by the step of individually influencing the measurable photon count rates which are simultaneously measured with different photon-counting detector elements and/or which are consecutively measured with the same photon-counting detector element such that the signal-to-noise ratio for the photon-counting detector array is increased compared with a case in which the measurable photon count rates are not individually influenced. The method further comprises the step of calculating an image based on the measured photon count rates under consideration of how each measurable photon count rate has been influenced. The method may in particular be implemented using the embodiments of the light microscope of the invention described herein.

As explained further above, the SNR of a photon-counting detector element depends on the impinging light intensity and has a maximum at a specific light intensity. With an array of photon-counting detector elements and a generally inhomogeneous intensity distribution over the detector array, merely adjusting the light intensity does not suffice for operating all or most of the photon-counting detector elements near their point of optimal SNR. This becomes possible in particular by individually adjusting the sensitivity of the photon-counting detector elements. Adjusting the sensitivity of a photon-counting detector element varies the likelihood that an impinging photon leads to an avalanche and thus a detectable signal. Reducing the sensitivity therefore allows to measure at higher intensities without saturating the specific detector element, i.e., without increasing its measured photon count rate. On the other hand, increasing the sensitivity in the case of very low intensities allows to operate the detector element closer to its optimum in SNR over intensity (i.e., closer to its point of saturation). Depending on the light intensity impinging on a specific detector element, either increasing or decreasing the sensitivity thus allows to optimize the overall SNR of measurement results of the detector array. As the light intensity impinging on the detector array is in general inhomogeneous, individually adjusting the sensitivity of different detector elements enhances the measurement accuracy and further increases the dynamic range as the detector elements illuminated with the lower intensity parts of the PSF contribute with higher count rates while the central pixels still work in the linear regime.

In more general terms, the control device individually influences the measurable photon count rates of the photon-counting detector elements, e.g., by setting the sensitivities individually. Other options further described below comprise influencing the intensity of a detection light beam over the light beam cross-section. A "measurable photon count rate" shall be understood as a photon count rate that can be measured with a photon-counting detector element under the present setup (of the light microscope). The measurable photon count rate depends on the sensitivity of the respective photon-counting detector element as well as factors influencing the intensity of detection light impinging on the respective photon-counting detector element. For example, the sensitivities of a first photon-counting detector element and a second photon-counting detector element may be set to different levels such that a common light intensity leads to a measured photon count rate of $m_1$ for the first photon-counting detector element and a measured photon count rate of $m_2 = k * m_1$ for the second photon-counting detector element. In this example, the measurable photon count rates of the two photon-counting detector elements vary by the factor k. The "measured photon count rate" shall be understood as the number of registered photons, i.e., a photon count rate that is actually measured by a photon-counting detector element, and thus constituting the outcome of the measurable photon count rate in the present setup.

Influencing the simultaneously measurable photon-count rates individually may be achieved by controlling the sensitivities of the photon-counting detector elements independently from each other. Influencing the consecutively measurable photon-count rates of one photon-counting detector element may be achieved by setting the sensitivity of this photon-counting detector element consecutively to different values.

The control device may be configured to individually influence the measurable photon count rates (in particular from different photon-counting detector elements) such that the signal-to-noise ratio of the photon-counting detector array is increased, in particular compared with a case in which the measurable photon count rates are not individually influenced. Without the individual adjustment, some photon-counting detector elements may receive an undue high light intensity that is above a respective saturation intensity and other photon-counting detector elements may receive an undue low light intensity that is considerably smaller than a respective saturation intensity (e.g., lower than 50% of the saturation intensity), both cases reducing the total SNR for the combination of all measured photon-count rates. By either adjusting the intensities or adjusting the sensitivities, it can be avoided that the light intensities reaching the different detector elements are unduly high or low.

The control device may be configured to individually influence the measurable photon count rates, e.g. by adjustment of the sensitivities, based on an expected light intensity distribution over the detector array. This knowledge may stem from previous reference measurements and/or may be based on initial assumptions. For example, the detector array may be used in a confocal scanning microscope. Detection light emanating from the specimen is focused on the detector array as a spot with a spot size defined by the PSF of the optical system. The detector array may be arranged such that its detector elements constitute sub-Airy detector elements, i.e., the detection light spot impinges on several of the detector elements. It may be assumed that central detector elements of the detector array receive a larger light intensity than detector elements at outer regions of the detector array. Hence, the predicted/expected intensity distribution may be derived from a given PSF of the system or based on general assumptions as presented above, without reference measurements being strictly necessary.

A filter may be arranged in a detection light path, i.e., between the specimen and the detector array. The filter is configured to variably adjust the intensities of detection light guided through the respective detector elements and is in particular a spatial light modulator (SLM). A SLM may be understood as any device capable of variably adjusting the intensity of the detection light over its cross-section. For example, an SLM may be formed by an array of adjustable micro lenses, diffractive optical elements, adjustable mirrors such as a digital micromirror device, or a controllable liquid crystal array. The control device may be configured to adjust the filter for individually influencing the measurable photon count rates. With such a filter it is possible to adjust the measurable photon count rates additionally or instead of through adjustment of the sensitivities. For example, the filter may block a larger part of detection light for a specific detector element that would otherwise be saturated, while not blocking or only blocking a smaller share of detection light for another detector element that operates below its saturation point. The filter may also be controllable to homogenize the intensity distribution, e.g., if formed as a phase retardation array, in which case it is not merely possible to reduce the light intensity for otherwise saturated detector elements, but also to increase the light intensity for detector elements that would otherwise receive only small intensities, e.g., below: 10% of their saturation intensity.

The control device may be configured to control the filter to reduce the measurable photon count rates with increasing expected intensity of light impinging on a respective photon-counting detector element. Similarly, the control device may be configured to reduce the sensitivity of one of the photon-counting detector elements with increasing expected intensity of light impinging on said photon-counting detector element. The control device may adjust all or at least some of the detector elements in this way and may thus set different sensitivities for the detector elements, depending on their respectively expected light intensity.

The photon-counting detector elements, for brevity also referred to as "detector elements" may in particular be SPADs (single photon avalanche detectors) which are in particular operated in the so-called Geiger mode. In the Geiger mode, a voltage $V_{OP}$ is applied at the diode of the SPAD which exceeds the breakdown voltage of the diode by an excess bias voltage. As a consequence, a photon absorption may lead to a charge avalanche and thus a countable event. The photon-counting detector array, or in short: detector array, may correspondingly be a SPAD array.

The control device may be configured to adjust the sensitivity of a respective photon-counting detector element by adjusting an excess bias voltage applied to the respective photon-counting detector element. In contrast to detector arrays in which only one common excess bias voltage can be set for all detector elements, the control device may thus be configured to set different excess bias voltages for the individual diodes.

The control device may be configured to use a signal strength measured at a current specimen point for determining the expected intensity distribution. The signal strength may be measured with the SPAD or another detector and may in particular be derived from a measured light intensity or measured photon count value.

The control device may be configured to determine the expected intensity distribution based on a calibration measurement which may be acquired with the photon-counting detector array. The calibration measurement may also be referred to as a reference intensity measurement and may be carried out at the same or a different specimen. In particular, it may be carried out at the same or another specimen point than the measurement for which the expected intensity distribution is actually used to set the sensitivities. For example, in a confocal scanning microscope, the overall intensity measured by the detector array depends strongly on the momentarily observed specimen point, but the relative distribution of the intensity over the detector array may only slightly depend on the momentarily observed specimen point-hence it may be possible to use a calibration measurement performed at one specimen point or region for adjusting the sensitivities of the detector elements used for measurements of other specimen points.

Setting the sensitivities of the detector elements based on the expected intensity distribution may be implemented by using a calibration matrix which assigns excess bias voltages (or properties dependent therefrom, such as the operating voltages or voltage differences relative to a reference voltage) to the photon-counting detector elements. The control device then sets the excess bias voltages of the detector elements according to the calibration matrix. The control device may be configured to derive the calibration matrix (or the expected intensity distribution) at least partially from a calibration/reference measurement in which an intensity distribution over the detector array is measured using a lower illumination light intensity to illuminate the specimen than used during the scan of the specimen in which the calibration matrix is employed for adjusting the sensitivities. Using a lower light intensity allows to determine the non-perturbed signal distribution without a significant risk of saturation.

In a further embodiment, the control device may be configured to determine, based on the expected intensity distribution, sensitivity settings for the photon-counting detector elements or filter settings which avoid measured photon count rates within non-linear response regions of the photon-counting detector elements, thus avoiding saturation of the respective detector element when the intensity impinging on the respective detector element equals the expected intensity. The intensity at which saturation occurs (saturation intensity) may be defined as the intensity at which the curve of measured photon counts over the intensity deviates from a linear relationship by a specific amount, e.g., 10% or 20% (cf. saturation intensity I-sat in FIG. 3). In related embodiments, the sensitivity may be set such that the measured photon count rate of one detector element is within a given interval around or below the saturation intensity when the expected intensity impinges on this detector element; wherein the given interval may for example be a number between 5% and 15% of the saturation intensity.

To increase the signal-to-noise ratio, the control device may be configured to influence the measurable photon count rates such that each photon-counting detector element operates in a response region in which its signal-to-noise ratio increases with increasing impinging light intensity or is at its respective maximum. The first characteristic is met when the detector element is not saturated. With regard to the SNR(I) curve shown in FIG. 4, the maximal SNR may be more generally understood such that the current intensity impinging on a detector element leads to an SNR that is at most 20% or at most 10% below the maximum of the SNR(I) curve. All detector elements may be operated in this way; alternatively at least more detector elements may be operated in this response region than in a case in which all detector elements are operated with the same characteristics (i.e., the same sensitivity settings, and in the case of a detection light filter: no individual intensity adjustment over the cross-section).

The light microscope may further comprise a detection light shaping device for homogenizing an intensity distribution of detection light before it impinges on the photon-counting detector array. The detection light shaping device may be adjustable to flexibly shape the intensity distribution, in particular based on the expected intensity distribution. For example, the detection light shaping device may comprise one or more adjustable optical elements such as diffractive optical elements, movable mirrors or lenses, phase retardation elements or liquid crystal elements. The detection light shaping device may be set such that the detection light distribution over the detector elements is more homogeneous than without the detection light shaping device. The sensitivity adjustment of the detector elements also takes into account any adjustments of the intensity distribution due to the detection light shaping device.

The light microscope may further comprise an illumination light shaping device for homogenizing an intensity distribution of illumination light before it impinges on the specimen. The illumination light shaping device may be built as described with regard to the detection light shaping device. The control device may be configured to use a setting of the illumination light shaping device in the determination of the expected intensity distribution. The illumination light shaping device may also be used to flexibly adjust an intensity distribution or the intensity as a whole (without affecting the relative distribution over the cross-section) during a scan of the specimen.

The control device may also be configured to group several of the photon-counting detector elements into one superpixel and output a respective measurement value for each superpixel. In many cases, it is sufficient and reduces the data amount if only one measurement value is output for such a group of detector elements. For example, if the detection light spot covers most of the detector array, superpixels may be sufficiently accurate whereas no superpixels or smaller superpixels may be preferred for smaller detection light spots. The groups may have any shapes such as one or more circles with rings surrounding the circle or circles. It is possible to measure two or more light spots simultaneously on the photon-counting detector array. Different PSF may apply for the different light spots and hence the light spots may have different sizes on the detector array. The groups for the larger light spot may be set to comprise more detector elements than the groups for the smaller light spot. The control device may be configured to set different sensitivities between the photon-counting detector elements of the same group/superpixel, according to the expected intensity distribution on the photon-counting detector array. In this way, the advantages of reduced data amount can be combined with the increased accuracy brought by the individual sensitivity adjustment.

The light microscope may in general be of any kind. In particular, the light microscope may be a (confocal) scanning microscope, a wide-field microscope or a combination thereof. A light microscope may be defined by comprising a specimen holder and an objective, in particular an infinity objective which sets the image distance to infinity. It may further comprise a tube with a tube lens arranged in a beam path behind the objective, i.e., between the objective and the detector array, to focus light from the objective into an (intermediate) image plane. In contrast to other optical systems, a light microscope produces at least one intermediate image plane. It may further comprise an illumination port to which the light source can be connected, for example one or more lasers. Detection light emanating from the specimen may be of any kind, e.g., fluorescence or phosphorescence light, illumination light that is scattered or influenced by the specimen through other mechanisms, or light emanating from the specimen for other reasons which may at least partially be caused by the illumination light. In general, specimen light may also be emitted due to effects unrelated to an illumination.

The light microscope may comprise an objective arranged to guide or focus illumination light on the specimen. The objective may in particular also be arranged to receive detection light emanating from the specimen and to guide the detection light towards the detector array. Generally, also a distinct objective may be used for receiving and guiding the detection light. The light microscope may further comprise a scanner arranged between the objective and the illumination port. The control device is configured to control the scanner to perform a scan of the specimen in which illumination light is scanned over the specimen. Optionally, the scanner may also direct the detection light coming from the objective towards the photon-counting detector array. The scanner may be understood as a device configured to adjustably deflect a light beam. It may comprise one or more movable optical elements such as mirrors, lenses or prisms. Alternatively it may also adjustably deflect the illumination light based on acousto-optical effects.

The effects of the invention are particularly advantageous in a descanned setup of a confocal scanning microscope. In this case, the objective and the scanner guide the illumination light as well as the detection light. As a consequence, a detection light spot on the detector array may rest while the specimen is scanned. The sensitivity settings of the detector elements may then be used unchanged throughout a specimen scan part or throughout the whole scan of the specimen. The detection light spot may have its maximum intensity at its center and may have an outwardly-decreasing intensity. In this case, detector elements at the center of the light spot may be set to the smallest used sensitivity level, with the sensitivity increasing towards outer parts of the detector array. Several specimen points may then be scanned one after the other with the same sensitivity settings at the detector array.

The photon-counting detector array and optical components of the light microscope may be arranged such that a diameter of a detection light spot on the photon-counting detector array corresponds within a 20% margin to a diameter of the photon-counting detector array. The diameter or size of the detection light spot may be defined to extend outwards to a point where the light intensity has dropped to 20% or alternatively 10% of the (center) peak intensity of the light spot. In this way, most detector elements are meaningfully employed in measuring a share of the detection light. Reference measurements may be used to ensure alignment of the light spot size with the detector array size.

During a scan of the specimen, the intensity of the detection light emitted from the specimen may obviously vary from point to point. For an optimal SNR, it is thus useful to adjust the sensitivities of the photon-counting detector elements, an illumination light intensity or the above-described filter to influence the measurable photon count rates during the scan of the specimen. For sake of clarity, this means that the simultaneously set sensitivities of the detector elements may be different from each other, and furthermore the sensitivity of each detector element may be changed during the scan of the specimen. The sensitivity settings may be changed for each specimen point or alternatively for specimen regions, wherein the same settings are used within a region. In this way, communication and calculation requirements are kept at lower levels. The regions may be predefined from a previously acquired specimen image, in particular by automatically identifying image areas of a similar brightness.

The control device may be configured for an on-the-fly adaption of the filter, the illumination light intensity or the sensitivities of the detector elements. In this case, the filter, the illumination light intensity or the sensitivities are adjusted during the scan of the specimen based on information acquired during the same scan. For example, the measured photon count rate of a specific detector element (or a mean count rate calculated from several or all detector elements) can be used for adjusting the sensitivity during the scan. In many specimens, changes in detection light intensity from one pixel (specimen point) to a next pixel are relatively small. Hence a measured photon count rate for one pixel can be used as the expected light intensity (i.e. for the sensitivity adjustment) for a next pixel during a scan. As an explanatory example, the sensitivity of detector elements may be reduced on-the-fly as soon as a measured photon count rate exceeds a predefined value.

Alternatively, expected intensity differences between specimen points may be determined from a reference image. The control device may be configured to control the light microscope components to acquire a reference image of the specimen (e.g., by scanning the specimen, in particular with low light intensity; alternatively the reference image might also be acquired as a widefield image). The control device may further be configured to determine expected intensities for individual specimen points from the acquired reference image, and to use the expected intensities in adjusting an illumination light intensity, the filter or the sensitivities of the photon-counting detector elements during the scan of the specimen to influence the measurable photon count rates. Depending on the acquisition technique of the reference image, the reference image may yield expected intensity distributions over the detector array for different specimen points or the reference image may yield one expected intensity value for the detector array per specimen point or per specimen region. If the acquisition of the reference image comprises acquisition of a respective intensity distribution on the detector array per specimen point, such information may be complete for setting the varying sensitivities of the detector elements during the scan of the specimen. If the acquisition of the reference image comprises acquisition of merely one intensity value for the whole detector array per specimen point, such information may be used together with further information on the expected intensity distribution for setting the varying sensitivities during the scan. For example, the relative intensity distribution (which defines the relative relationship between sensitivities of the detector elements but does not define the absolute values of the sensitivities) may be pre-known or derived from a reference measurement at just one specimen point: such a relative intensity distribution may be used together with the one intensity value determined for the whole detector array per specimen point to calculate the expected intensity distribution per specimen point.

The control device may alternatively or additionally be configured to adjust an illumination light intensity during the scan of the specimen based on the expected intensities for individual specimen points determined from the acquired reference image. If the expected intensity distribution is calculated at least in part based on the reference image, the control device may also take into account how the illumination light intensity is set for the scan of the specimen compared with the illumination light intensity used for acquisition of the reference image.

Instead of acquiring a reference image for setting the sensitivities or adjusting the illumination intensity, a (confocal) multipoint setup may also be used for this purpose. For clearer terminology, a first illumination spot will be referred to as a "pilot light spot". Further illumination spot(s) will be scanned over specimen parts that have already been scanned with the pilot light spot. The pilot light spot and the further illumination spots may have similar properties, in particular the same wavelength(s) and the same spot size, and may be generated by splitting a light beam from one light source or may be generated with different light sources. In this embodiment, optical elements of the light microscope are configured for a multipoint illumination in which a pilot light spot and one or more illumination spots are simultaneously scanned over the specimen, wherein the one or more illumination spots are scanned over specimen points which have been previously scanned with the pilot light spot. The control device is configured to use measurement data recorded with the pilot light spot for a specimen point to adjust the intensity of illumination light, a spatial light modulator configured to adjust the intensity of detection light over its cross-section, and/or the sensitivities of the photon-counting detector elements when the one or more illumination spots are directed onto said specimen point. If the measurement data recorded for a specific specimen point with the pilot light spot indicate that the current light intensity would lead to undesired high measured photon count rates when one of the illumination spots impinges on that specific specimen point, the current light intensity is reduced, and/or the spatial light modulator reduces the detection light intensities, and/or the sensitivities are reduced.

If more than one illumination light spot is used, a respective detector array with several photon-counting detector elements may be used. The detector arrays may be part of one common array or may be spatially separated arrays.

A photomultiplier tube, PMT, with a high dynamic range (with or without PSF oversampling) may be provided and arranged to measure detection light associated with the pilot light spot (for example, the detection light may be fluorescence light emitted by the specimen due to impinging pilot light, or the detection light may be pilot light scattered at the specimen). In contrast, SPAD array(s) may be used for measuring detection light associated with the one or more illumination spots.

The sensitivity adjustments help in avoiding or reducing saturation of detector elements. Nevertheless, it may occur that some of the detector elements become saturated. In this case, it may be useful to replace or adjust their measured photon count rates with other values extrapolated from the simultaneously measured photon count rates of other detector elements of the array. In one embodiment, the control device is configured to perform an extrapolation, in which one or more highest measured photon count rates are replaced or amended by extrapolated photon count rates determined from measured photon count rates of others of the photon-counting detector elements. The extrapolation may use the expected intensity distribution (or a characteristic derived therefrom, e.g., the sensitivity settings of the detector elements). For example, if the expected intensity distribution predicts the photon count rate of a central detector element to be 10 times as large as the average photon count rate of certain outer detector elements, but due to saturation the measured photon count rate of the central detector element is merely 3 times as large (after considering different sensitivity settings), then this measured photon count rate may be replaced by an extrapolated photon count rate based on the measured photon count rates of the outer detector elements and the expected difference (in this case the factor 10) to the photon count rate of the central detector element. In related embodiments, the control device is configured to determine extrapolated photon count rates based on a calibration matrix which relates to the excess bias voltages applied to the photon-counting detector elements. In this case, the values of the calibration matrix are used for calculating an extrapolated value.

Occurrence of saturation may be used as a criterion whether or not a photon count rate of a specific detector element shall be replaced by an extrapolated value. As a criterion to determine the occurrence of saturation, a photon count threshold may be predefined and if a measured photon count rate exceeds the photon count threshold, it is replaced by an extrapolated photon count rate. In further embodiments, such use of a predefined photon count threshold may be seen separated from the occurrence of saturation. For example, it is generally possible to correct a measured photon count rate determined with a saturated detector element (cf. arrows correcting the curve m in FIG. 3 to curve m-corr). Therefore, the SNR may be the driving factor whether or not to replace a measured photon count rate with an extrapolated value. When the light intensity is only slightly above a saturation intensity, the SNR of such a measured photon count rate (which is then corrected as shown in FIG. 3) may still be preferable to an extrapolated value. Hence, the above-mentioned predefined photon count threshold may also be set independently and/or higher than a photon count rate at which saturation begins.

In a variant of the above embodiments, the extrapolation for one detector element may not or not only use (simultaneously) measured photon count rates of others of the photon-counting detector elements, but it may be based on a previously acquired reference image, and the calibration matrix/expected intensity variations.

In a further variant, the extrapolation of count values is performed in that the number of counted events is set into relation with the sensitivity adjustment of the specific detector elements. So, with the knowledge about the sensitivity distribution on one hand, the number of photons hitting the detector array can be recovered. On the other hand the PSF distribution is obtained and can be used as an input for image scanning microscopy. The control device may be configured to recover the detected PSF shape (i.e., the shape of the point spread function with which light impinges on the detector array) by normalizing measured photon count rates with the set sensitivities. As the photon count rates (that are simultaneously measured with different detector elements or consecutively measured with the detector array) may be measured with different sensitivities, a normalization calculation may be advantageous in which the respective sensitivity with which a specific photon count rate is measured is used for adjusting that photon count rate.

The control device may be configured to calculate an image based on the measured photon count rates and under consideration of how each measured photon count rate has been influenced. For example, if a measurable photon count rate of a first detector element is $m_1$ and the measurable photon count rate $m_2$ of a second detector element is $m_2 = k \cdot m_1$ in case of identical light intensities emanating from the specimen towards both detector elements, then the measured photon count rate of the second detector element may be divided by k to yield results that can be compared with the measured photon count rates of the first detector element.

The expected intensity distribution over the detector array may in general be understood as any assumption about an intensity distribution. It may relate to the relative relationship between the detector elements of the array, or to their absolute values. Setting the sensitivities of the detector elements based on the expected intensity distribution may be understood as setting the operational voltages of the detector elements to different levels. The expectation of the intensity distribution does not necessarily need to be specific for the momentarily measured specimen point but may rather be a general expectation, e.g., based on a reference measurement or knowledge of the PSF at another specimen or another specimen point.

The control device may comprise electronic components such as FPGAs for measuring signals and controlling the detector array. The control device may in particular comprise one or more computers or processing units that may be formed as a single unit or as a distributed system. Functions or the control device may be implemented as software and/or as hardware. The control device or parts thereof may in particular be provided through server or computer applications that communicate with other components of the light microscope through a network.

A specimen point may be defined as a part of the specimen for which the detector elements count photons during a pixel dwell time. After lapse of the pixel dwell time, the scanner illuminates another part of the specimen which is defined as a next specimen point.

Embodiments described herein which refer to "specimen points" may also be modified to apply to "specimen regions" instead: for example, instead of performing steps individually for each specimen point, those steps may only differ between regions of several specimen points but may be identical for specimen points within the region.

Similarly, embodiments which define steps for each detector element may also be modified such that the steps apply to at least some but not necessarily all of the detector elements.

For easier intelligibility, the expression "light spot" is frequently used in this disclosure to refer to the light distribution on the specimen or on the detector array. In more general terms, the "light spot" may be replaced by any other light distribution, e.g. a ring pattern, one or more lines or several spots or rings.

The described imaging method may be used with a light microscope or another imaging system in which light is to be measured precisely over a large dynamic range, for example for material analysis, production supervision, entertainment systems or in life sciences.

The intended use of the different embodiments of the light microscope of the invention results in variants of the method of the invention. Similarly, the light microscope of the invention may be configured to carry out the described exemplary methods of the invention. In particular the control device may be configured to control the other components of the light microscope to carry out the method steps described herein.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components.

DETAILED DESCRIPTION OF EMBODIMENTS

Figure 1:
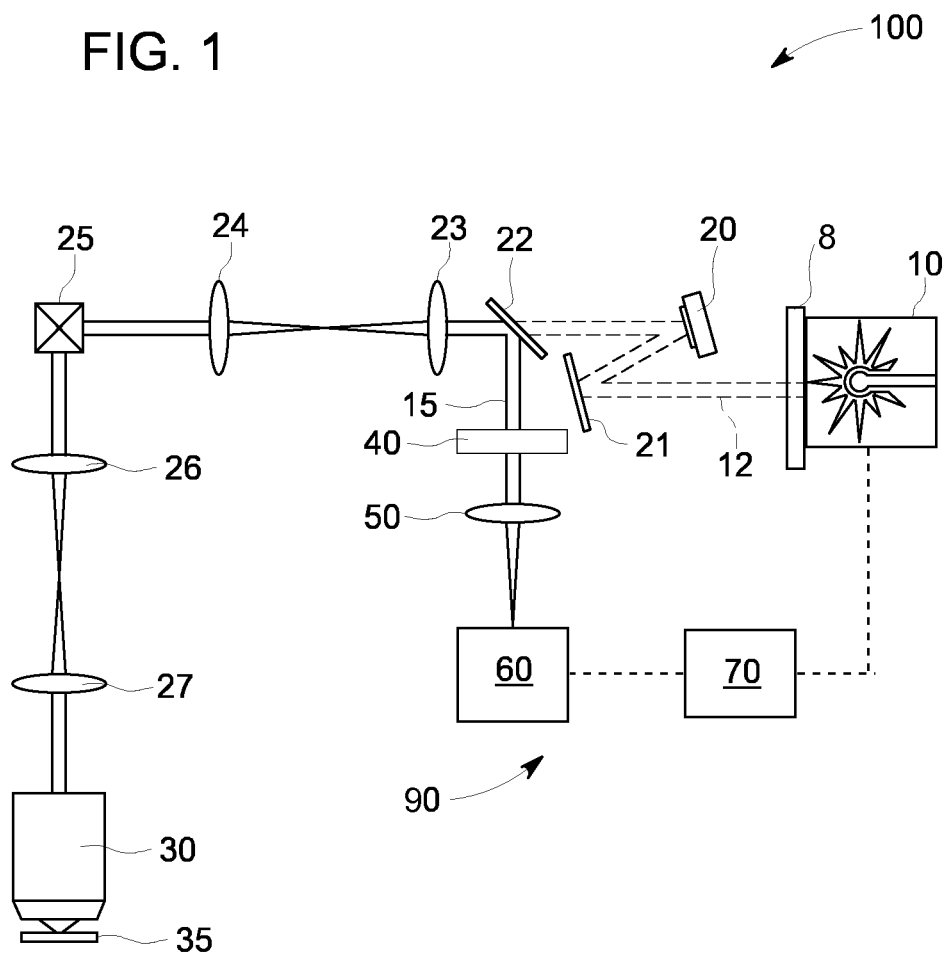
FIG. 1 shows schematically an embodiment of a light microscope according to the invention.

FIG. 1 shows schematically an embodiment of a light microscope 100 of the invention.

The light microscope 100 comprises an illumination port 8 to couple-in illumination light 12 emitted from a light source 10. The light source 10 may comprise, for example, one or more lasers.

The exemplary light microscope 100 is formed as a laser scanning microscope. It comprises a scanner 25 which comprises one or more movable mirrors or other movable optical elements to scan the illumination light 12 over a specimen 35. Optical elements 21, 23, 24, 26 and 27 may be used to guide illumination light 12 from the light source 10 via the scanner 25 to an objective 30. The objective 30 focuses the illumination light 12 onto a specimen point, and due to the scanning motion caused by the scanner 25, different specimen points are consecutively illuminated.

The specimen 35 emits detection light 15 which may, for example, be fluorescence or phosphorescence light. The illumination light 12 may be pulsed and may in particular result in a multi-photon excitation of particles in the specimen 35. Detection light 15 is thereby emitted only from a small specimen point and has a different (in particular smaller) wavelength than the illumination light 12.

In the depicted descanned setup, the detection light 15 is guided via the objective 30, the scanner 25 and the optical elements 27, 26, 24, 23, on the same beam path as the illumination light 12. A beam splitter 22 is used for spatially separating the detection light 15 from the illumination light 12. As an example, the beam splitter 22 may be configured to transmit or reflect impinging light depending on its wavelength. The detection light 15 is then focused with a lens or lens group 50 onto a single-photon detector array 60. One or more pinholes for a confocal design may optionally be provided (not depicted).

A control device 70 controls the single-photon detector array 60, the light source 10 and the scanner 25, and may also be configured to control further components of the light microscope 100. The single-photon detector array 60, the control device 70, and optionally further optical elements may be jointly referred to as an optical assembly 90. In this embodiment, the optical assembly 90 is part of the light microscope 100 but in general the optical assembly 90 may also be used in other imaging systems.

Figure 2:
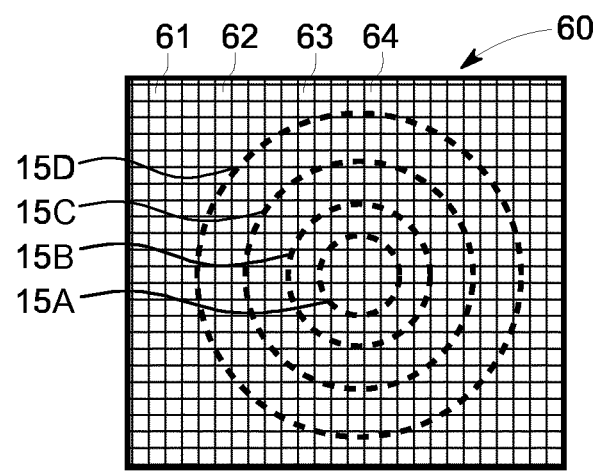
FIG. 2 shows schematically the photon-counting detector array of the light microscope of FIG. 1.

An enlarged illustration of the single-photon detector array 60 is shown in FIG. 2. It comprises a plurality of single-photon detection elements 61-64 which are arranged next to each other in a two-dimensional array, e.g., a hexagonal or rectangular arrangement. Detection light 15 forms a light spot or more generally a light distribution on the detector array 60. In the case of a confocal scanning microscope, the light spot on the detector array 60 is substantially at rest while the scanner 25 scans illumination light 12 over the specimen 35. The light intensity of the light spot on the detector array 60 varies depending on the illuminated specimen point. Rings 15A-15D in FIG. 2 illustrate the illumination distribution on the detector array 60. The light spot may have its maximum intensity within a central circle 15A, and may have an outwardly decreasing intensity, e.g., as described by a Gaussian profile.

The detector array 60 is positioned in a conjugate focal plane relative to the excitation spot in the specimen plane. Zoom optics (not depicted) in front of the detector array 60 may be used to project a defined number of Airy unit (AU) orders onto the detector array 60. The Airy unit may be understood as the diameter of an Airy disc which is a detection light spot caused by a point source in the specimen plane (onto which the objective 30 is focused). As shown in FIG. 2, the detector elements 61-64 have a size and distance to each other that is small enough to constitute pinholes with sizes smaller than 1.0 AU, and are thus referred to as sub-Airy detector elements. In this way, information on the point spread function can be determined and the so-called image scanning microscopy becomes possible.

Figure 3:
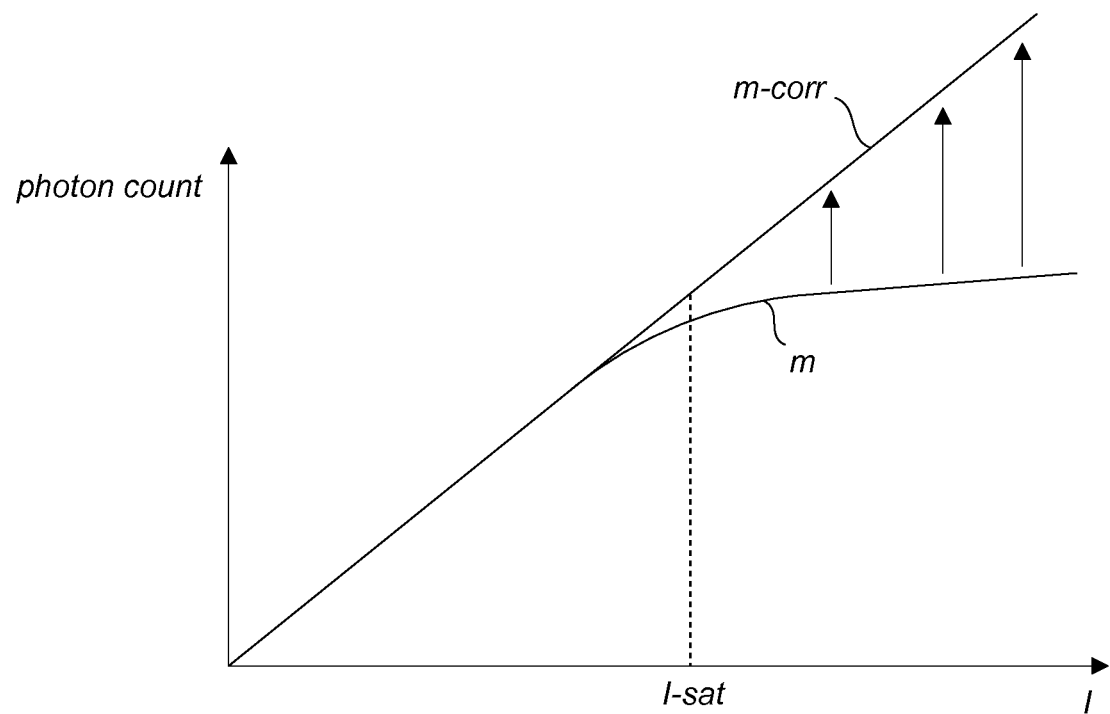
FIG. 3 is a graph of the measured photon count rate of one photon-counting detector element over the light intensity.
Figure 4:
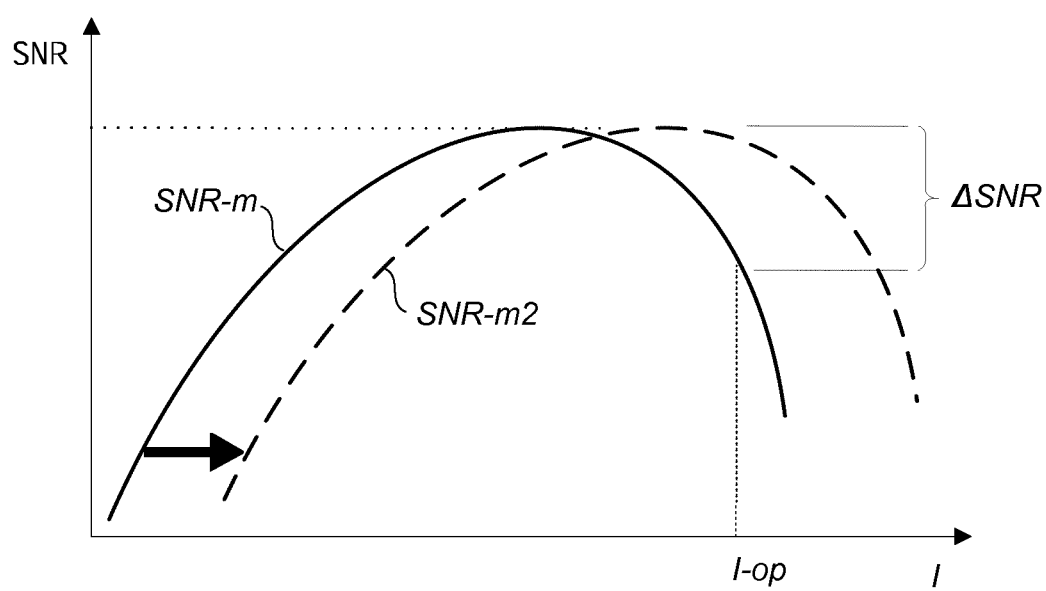
FIG. 4 is a graph of the SNR over the light intensity for one photon-counting detector element.

The single-photon counting detector elements 61-64 may in particular be formed as an array of SPADs (single photon avalanche diodes). SPADs offer a good sensitivity at low light levels and fast response times. Still, improvements in the dynamic range are desirable. As explained further above with regard to FIG. 3, the photon count rate m that is output by a single-photon counting detector element or a detector array is linearly proportional to the actual number of impinging photons (or intensity I) within a certain range. However, with increasing intensities the curve m(I) flattens due to saturation of the single-photon counting detector element(s). It is generally possible to correct the flattened curve m(I) at large intensities, shown as curve m-corr in FIG. 3. This is particularly true for actively quenched SPADs. This increases the dynamic range. However, the effects on the signal-to-noise-ratio (SNR) in dependence on the intensity are shown in FIG. 4 as curve SNR-m. For low intensities I of detection light 15 impinging on the detector array 60, the SNR increases with increasing intensity I, which may follow an $I^{(1/2)}$ proportionality. When the detector elements saturate, however, the measured photon count rate may be corrected (as shown in FIG. 3), in which case the SNR decreases. Hence, while the dynamic range of a SPAD array 60 may be increased, the SNR at high intensities is still a concern in conventional designs. In particular this problem is tackled in the present disclosure.

Each of the detector elements 61-64 has an adjustable sensitivity. It may either possible to adjust the sensitivity of each detector element 61-64 independently from each other, or to adjust the sensitivity of groups of detector elements. To adjust the sensitivity, the operating voltage $V_{OP}$ at a diode of the respective detector element 61-64 may be adjusted by the control device 70. An operating voltage $V_{OP}$ slightly above the breakdown voltage of a detector element may constitute a low sensitivity. An increase in the operating voltage $V_{OP}$ further above the breakdown voltage (i.e. the excess bias voltage) constitutes an increase in sensitivity. By adjusting the sensitivity or excess bias voltage of a detector element, its SNR dependency on the intensity is shifted. This is shown as curve SNR-m2 in FIG. 4: By decreasing the sensitivity of a detector element, it is possible to shift its SNR curve from SNR-m to SNR-m2.

If the intensity/impinging on a specific detector element is I-op, it is possible to find and set a specific sensitivity such that the SNR(I) curve has its maximum at I-op. Similarly, the impinging light intensity I-op may be adjusted to a value at which the SNR(I) curve has its maximum. In the example of FIG. 4, adjusting the sensitivity of a detector element to shift its SNR(I) curve from SNR-m to SNR-m2 (as shown with the arrow in FIG. 4) results in an improvement of the SNR indicated as Δ-SNR.

The effects on the SNR for a single detector element 61-64 similarly apply to a detector array 60, the functional dependence being, however, different. It is important to set different sensitivities for the detector elements 61-64 of the detector array 60 depending on the intensity received by the respective detector element 61-64.

For optimizing the SNR, the photon count rates measured by the respective detector elements 61-64 are relevant. The measurable photon count rates may be influenced by adjusting the sensitivities of the detector elements 61-64 as described above. Alternatively or additionally, the control unit 70 may also influence the measurable photon count rates by adjusting the detection light intensity distribution on the detector elements 61-64. For example, a filter 40 may be arranged in the detection light path. The filter 40 may also be referred to as a detection light shaping device or spatial light modulator. It may comprise an adaptive optical element and may be configured to controllably adjust the intensity distribution over the cross-section. Also in this way it is possible to operate the SPAD elements 61-64 near their respective SNR maximum.

For easier intelligibility, controlling the measurable photon count rate is explained often by adjusting the sensitivities of the detector elements. However, variants of such embodiments are formed by adjusting the filter 40 instead of the sensitivity for similar results.

An expected intensity distribution may be used by the control device 70 to set the sensitivities of the detector elements 61-64. The expected intensity distribution may at least partially be based on assumptions without calibration measurements, for example that outer detector elements of the array 60 are expected to receive a lower intensity than central detector elements, and hence the sensitivity of the outer detector elements is set higher than the sensitivity of the central detector elements. In case that another beam profile is assumed, e.g., a ring-like illumination, the sensitivity of central detector elements may be set higher than a sensitivity of detector elements arranged in a ring around the central detector elements, and the sensitivity of outer detector elements further outside of the ring-like illumination may also be set higher than the sensitivity of detector elements arranged in the ring.

Additionally or alternatively, one or more calibration measurements may be used to determine an expected intensity distribution. For example, a measurement at the specimen or at another sample may be carried out as a reference measurement, wherein the intensity distribution over the detector array 60 is measured. The reference measurement may be carried out with an intensity (reference intensity) for which no saturation occurs, cf. FIGS. 3 and 4. The following measurement for recording a specimen image may be carried out at another (higher) intensity, wherein the intensity difference to the reference intensity is known. The intensity distribution measured during the reference measurement may be used for establishing the shape of the expected intensity distribution, which is then scaled by a factor derived from the above-mentioned intensity difference. It thus becomes possible to set the sensitivities of the detector elements 61-64 such that each detector element 61-64 operates near its SNR(I) maximum. For example, each detector element 61-64 may operate within a deviation of not more than 20% or 10% from its SNR(I) maximum, for a given intensity I-op. A calibration matrix may be used which comprises the sensitivity settings for each detector element, e.g., the operating voltages of respective diodes of the detector elements. The calibration matrix may thus form a list of voltage values.

During the scan of the specimen 35 shown in FIG. 1, the illumination intensity may be adjusted to compensate for variations in the detection light intensity, i.e., for specimen points with a stronger emission of detection light, the illumination intensity is lowered, and vice versa. In this way, it is possible to use a specific calibration matrix throughout the scan of a specimen region or even throughout the whole scan of the specimen.

To reduce the required sensitivity differences set for the detector elements 61-64, an illumination light shaping device 20 and/or the detection light shaping device or filter 40 may be used. The illumination light shaping device 20 is arranged in the beam path of the illumination light 12 and may help in reducing intensity variations over the cross-section of the illumination light 12. Similarly, the detection light shaping device 40 may help in reducing intensity variations over the cross-section of the detection light 15. The light shaping devices 20 and 40 may comprise an adaptive optical element (e.g. a so-called spatial light modulator) which is set to reduce intensity variations over the detector array 60 measured in a/the calibration measurement.

The light microscope 100 described herein allows measurements over a high dynamic range with improved SNR. Such advantages are described for the descanned confocal scanning microscope of FIG. 1, wherein other embodiments of light microscopes and imaging techniques also profit from the described advantages. For example, the embodiment of FIG. 1 may be modified to form a non-descanned setup, or the light microscope may not use the confocal or scanning principle.

Figure 5:
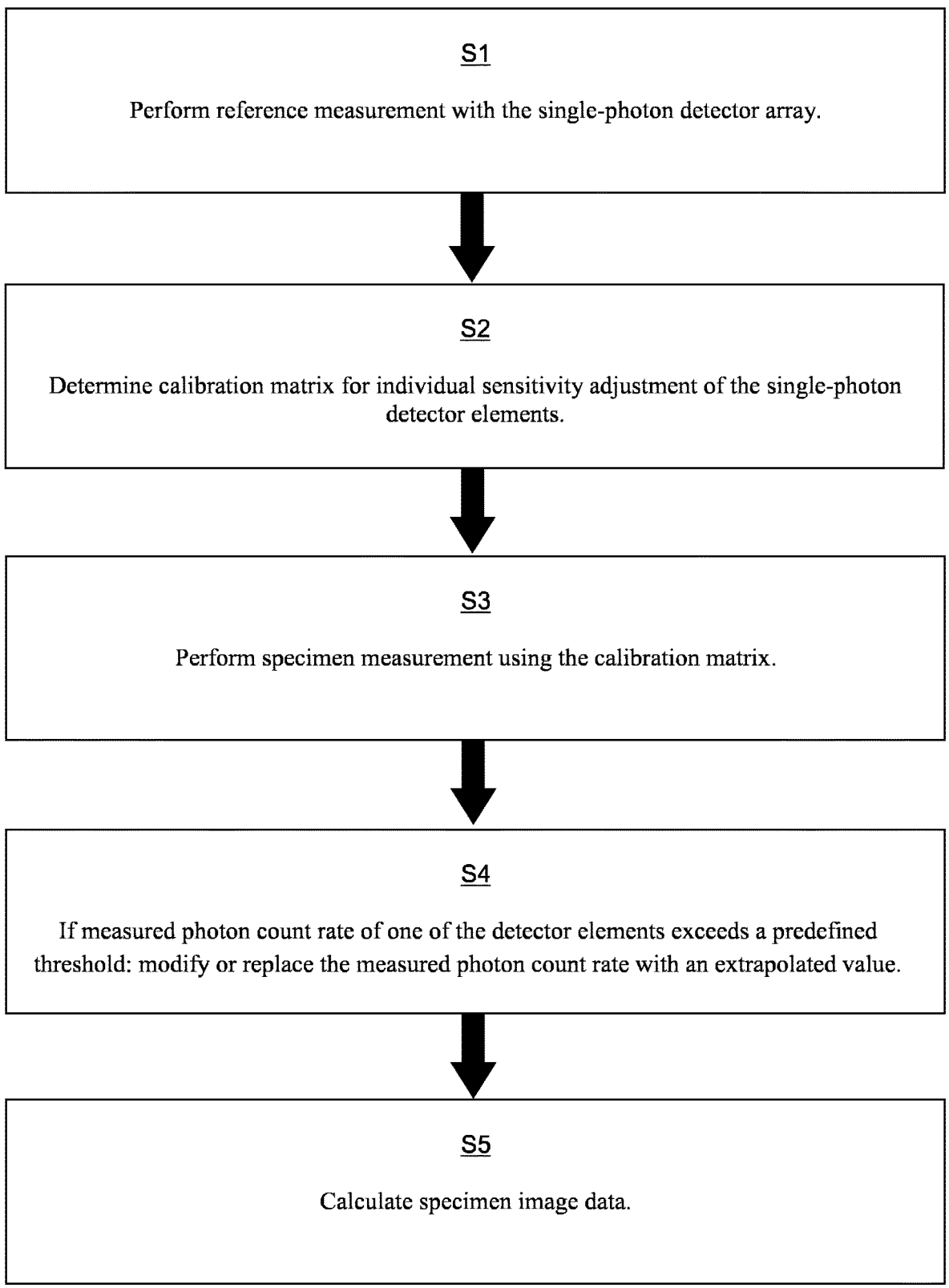
FIG. 5 illustrates the steps of an exemplary method of the invention.

FIG. 5 shows steps of an exemplary variant of the method of the invention in the specific case where a calibration matrix is determined and applied. In step S1, a reference measurement is performed with the single-photon detector array, i.e., each detector element outputs a measured photon count rate. In step S2, a calibration matrix is determined which is later used to individually adjust the sensitivities of the detector elements to control the measurable photon count rates. The calibration matrix may include one sensitivity adjustment value (e.g. SPAD operating voltage) for each detector element. The sensitivity adjustment value for each detector element may be derived from the photon count rate measured with that detector element in S2, using a predefined formula. For example, the sensitivity may be set to decrease with increasing measured photon count rate. In other words, the SPAD operating voltage or excess voltage may be set to decrease with increasing measured photon count rate. Next, in step S3 a specimen measurement is performed in which the sensitivities of the detector elements are individually adjusted using the calibration matrix. Step S4 may be optionally performed: If a photon count rate measured in S3 exceeds a predefined threshold (e.g., a saturation threshold), this measured photon count rate may be replaced by an extrapolated value as described further above. Finally, in step S5 the photon count rates of step S3, possibly corrected in step S4, are further processed to output specimen image data used for displaying a specimen image.

The steps S1-S5 as described above may in particular be used to examine a single specimen point. In case of a scanning light microscope, the following modifications to steps S1-S5 may be implemented: In a modified step S1, a reference scan of the sample is performed and reference measurements with the detector array are performed for several specimen points. This is followed by a modified step S2, in which several calibration matrices are determined for different specimen points or regions. In a modified step S3, a scan of the specimen is performed during which the several calibration matrices are used consecutively, according to a current scan position. Step S4 may then follow as described above. Finally, in a modified step S5 the measured photon count rates are processed to output a specimen image. Within this step, the image data may be processed according to Airyscan techniques to yield an image with a particularly good resolution. The photon count rates of the respective detector elements may be normalized with their respectively set sensitivities, in particular to recover the actual shape of the PSF.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE SIGNS

- 8 illumination port
- 10 light source
- 12 illumination light
- 15 detection light
- 15A-15D intensity distribution over the detector array 60
- 20 illumination light shaping device
- 21, 23, 24, 26, 27 optical elements
- 22 beam splitter
- 25 scanner
- 30 objective
- 35 specimen
- 40 detection light filter or detection light shaping device
- 50 lens
- 60 photon-counting detector array
- 61-64 photon-counting detector elements
- 70 control device
- 90 optical assembly
- 100 light microscope
- m measured photon count
- m-corr corrected measured photon count
- SNR signal-to-noise ratio
- SNR-m signal-to-noise ratio for the curve m
- SNR-m2 SNR in case of an adapted detector element sensitivity
- ΔSNR difference in SNR due to change in detector element sensitivity
- I light intensity on the detector element or detector array
- I-op specific detection light intensity value
- I-sat saturation intensity
- S1-S5 method steps

What is claimed is:

1. A light microscope comprising:
   a light source for illuminating a specimen,
   a photon-counting detector array with a plurality of photon-counting detector elements for measuring detection light coming from the specimen,
   wherein the photon-counting detector elements are configured to output respective measured photon count rates, and
   a control device for controlling the photon-counting detector array,
   wherein
   the control device is configured to individually influence the measurable photon count rates, which are at least one of:
   simultaneously measurable with different photon-counting detector elements and consecutively measurable with the same photon-counting detector element.

2. The light microscope according to claim 1,
   wherein the control device is configured to individually influence the measurable photon count rates from different photon-counting elements such that the signal-to-noise ratio of the photon-counting detector array is increased, compared with a case in which the measurable photon count rates are not individually influenced.

3. The light microscope according to claim 1,
   wherein the control device is configured to use an expected intensity distribution on the photon-counting detector array for individually influencing the measurable photon count rates.

4. The light microscope according to claim 1,
   wherein the control device is configured to adjust sensitivities of the photon-counting detector elements for individually influencing the measurable photon count rates, wherein the control device is configured to adjust the respective sensitivities of the photon-counting detector elements by adjusting an excess bias voltage applied to the respective photon-counting detector elements, the excess bias voltage defining an amount by which a voltage applied to a diode of the respective photon-counting detector element exceeds a breakdown voltage of the diode.

5. The light microscope according to claim 1,
   wherein a filter is arranged in a detection light path and configured to adjust an intensity of the detection light,
   wherein the control device is configured to adjust the filter for individually influencing the measurable photon count rates.

6. The light microscope according to claim 4,
   wherein the control device is configured to control
   the filter, which is configured for adjusting the intensity of the detection light over its cross-section, or
   the sensitivities
   to reduce the measurable photon count rates with increasing expected intensity of light impinging on a respective photon-counting detector element.

7. The light microscope according to claim 1, further comprising:
   a scanner configured to scan the specimen with illumination light and to direct the detection light towards the photon-counting detector array,
   wherein the control device is configured to use a signal strength measured at a current specimen point for determining the expected intensity distribution.

8. The light microscope according to claim 3,
   wherein the control device is configured to determine the expected intensity distribution based on a calibration measurement acquired with the photon-counting detector array.

9. The light microscope according to claim 3,
wherein the control device is configured to
set the sensitivities using a calibration matrix which assigns different excess bias voltages to the photon-counting detector elements,
derive the calibration matrix at least partially from a calibration measurement which uses a lower illumination light intensity than used during a scan of the specimen in which the calibration matrix is used for adjusting the sensitivities.

10. The light microscope according to claim 3,
wherein the control device is configured to determine—based on the expected intensity distribution—sensitivity settings for the photon-counting detector elements which avoid measured photon count rates within non-linear response regions of the photon-counting detector elements.

11. The light microscope according to claim 1,
further comprising:
an illumination light shaping device for homogenizing an intensity distribution of illumination light before impinging on the specimen.

12. The light microscope according to claim 1,
wherein the control device is configured
to group several of the photon-counting detector elements into one superpixel,
to set different sensitivities between the photon-counting detector elements of the same superpixel, according to the expected intensity distribution on the photon-counting detector array,
output a respective measurement value for each superpixel.

13. The light microscope according to claim 3,
wherein the control device is configured to perform an extrapolation, in which:
one or more highest measured photon count rates are amended by extrapolated photon count rates determined from measured photon count rates of others of the photon-counting detector elements, using the expected intensity distribution; wherein the control device is configured to determine extrapolated photon count rates based on a calibration matrix which relates to the excess bias voltages applied to the photon-counting detector elements.

14. The light microscope according to claim 3,
wherein the control device is configured to recover a detection point spread function ("PSF") shape by normalizing measured photon count rates with the set sensitivities; wherein the control device is configured to calculate an image based on the measured photon count rates under consideration of how each measured photon count rate has been influenced.

15. The light microscope according to claim 1,
wherein the photon-counting detector array is arranged such that the photon-counting detector elements constitute sub-Airy detectors with a center-to-center distance between neighbouring photon-counting detector elements smaller than 1 Airy disc diameter.

16. The light microscope according to claim 1,
wherein the photon-counting detector array and optical components of the light microscope are arranged such that a diameter of a detection light spot on the photon-counting detector array corresponds within a 20% margin to a diameter of the photon-counting detector array.

17. The light microscope according to claim 4,
wherein the control device is configured to control the scanner to perform a scan of the specimen, and
the control device being further configured to adjust an illumination light intensity, the filter or the sensitivities to influence the measurable photon count rates during the scan of the specimen:
wherein the control device is configured to
acquire a reference image of the specimen,
determine expected intensities for individual specimen points from the acquired reference image, and
use the expected intensities to adjust an illumination light intensity, the filter or the sensitivities of the photon-counting detector elements during the scan of the specimen to influence the measurable photon count rates;
wherein the control device is configured for an on-the-fly adaption by adjusting the sensitivities, the filter or the illumination light intensity during the scan of the specimen based on information acquired during the same scan.

18. The light microscope according to claim 1,
wherein the control device and optical elements of the light microscope are configured for a multipoint illumination in which a pilot light spot and one or more illumination spots are simultaneously scanned over the specimen, wherein the one or more illumination spots are scanned over specimen points which have been previously scanned with the pilot light spot,
wherein the control device is configured to use pilot light spot measurement data recorded with the pilot light spot for specific specimen points to adjust at least one of:
an illumination light intensity,
a spatial light modulator configured to adjust the intensity of the detection light over its cross-section, and
the sensitivities of the photon-counting detector elements for the one or more illumination spots when they are at the corresponding specimen points for which the pilot light spot measurement data have been recorded:
the light microscope further comprising a photomultiplier tube arranged to measure detection light associated with the pilot light spot,
the photon-counting detector elements are single-photon avalanche photodiodes arranged to measure detection light associated with the one or more illumination spots.

19. An imaging method, comprising
illuminating a specimen with illumination light,
measuring detection light coming from the specimen with a photon-counting detector array comprising a plurality of photon-counting detector elements, the photon-counting detector elements outputting respective measured photon count rates,
wherein
individually influencing the measurable photon count rates, which are at least one of:
which are simultaneously measured with different photon-counting detector elements and
consecutively measured with the same photon-counting detector element,
such that the signal-to-noise ratio for the photon-counting detector array is increased compared with a case in which the measurable photon count rates are not individually influenced, and calculating an image based on the measured photon count rates under consideration of how each measurable photon count rate has been influenced.

20. The imaging method according to claim 19, wherein the step of individually influencing the measured photon counts is performed by setting at least one of:
- an illumination light intensity or distribution,
- the sensitivity of the photon-counting detector elements, and
- a filter configured to spatially adjust the detection light intensity over its cross-section;

to increase the signal-to-noise ratio, the measurable photon count rates are influenced such that each photon-counting detector element operates in a response region in which its signal-to-noise ratio
increases with increasing impinging light intensity or is at its respective maximum.

* * * * *

UNITED STATES PATENT AND TRADEMARK OFFICE
CERTIFICATE OF CORRECTION

PATENT NO. : 12,055,700 B2
APPLICATION NO. : 17/424293
DATED : August 6, 2024
INVENTOR(S) : Tiemo Anhut et al.

It is certified that error appears in the above-identified patent and that said Letters Patent is hereby corrected as shown below:

In the Specification

Column 20, Line 7    now reads: "the scan of the specimen:"
                     Should read -- the scan of the specimen; --

Column 20, Line 42   now reads: "been recorded"
                     Should read -- been recorded; --

Column 20, Line 61   now reads: "...detector elements and"
                     Should read -- ...detector elements; --

Signed and Sealed this
Seventeenth Day of September, 2024

Katherine Kelly Vidal
*Director of the United States Patent and Trademark Office*